United States Patent

[11] 3,624,289

[72] Inventor Don J. Dudley
Brightwaters, N.Y.
[21] Appl. No. 67,167
[22] Filed Aug. 26, 1970
[45] Patented Nov. 30, 1971
[73] Assignee Data-Plex Systems, Inc.
New York, N.Y.

[54] APPARATUS FOR BLANKING PORTION OF FIELDS OF TELEVISION VIDEO SIGNALS

6 Claims, 5 Drawing Figs.

[52] U.S. Cl. ........ 178/7.3 E, 178/5.6, 178/DIG. 23
[51] Int. Cl. ........ H04n 5/46, H04n 7/08
[50] Field of Search ........ 178/6, DIG. 6, DIG. 13, DIG. 23, 7.3 E, 6.8, 7.5 E, 5.6; 35/9 R, 9 B

[56] References Cited

UNITED STATES PATENTS

| | | | |
|---|---|---|---|
| 3,180,931 | 4/1965 | Morchand | 178/6.8 |
| 3,256,386 | 6/1966 | Morchand | 178/5.6 |
| 3,273,260 | 9/1966 | Walker | 35/9 R |
| 3,566,482 | 3/1971 | Morchand | 35/9 R |

*Primary Examiner*—Robert L. Griffin
*Assistant Examiner*—John C. Martin
*Attorney*—Hane, Baxley & Spiecens

ABSTRACT: Connected between the antenna and the antenna input terminals of a conventional television receiver is an R.F. gate which controllably passes television signals from the antenna to the receiver. The gate is controlled by selected blanking signals, to pass selected portions of the television fields. The gate also receives override signals to prevent the blocking of transmission during the occurrence of the raster synchronizing signals. The override signals are derived from the raster-driving signals generated in the receiver in response to the raster-synchronizing signals. Inductive pickup means positioned outside the receiver in the vicinity of the receiver's deflection yoke radiatively receives the raster-driving signals which are then delayed to become the override signals.

INVENTOR.
DON J. DUDLEY
BY Hane, Baxley and Spiecens
ATTORNEYS

APPARATUS FOR BLANKING PORTION OF FIELDS OF TELEVISION VIDEO SIGNALS

This invention pertains to television receivers and, more particularly, to such receivers which include means for selectively viewing portions of television fields.

There have been proposed television teaching systems and the like wherein each television field is divided into several parts such as quadrants or even horizontal bands. Each part is a self-contained unit of information. Subject to posed questions a student presses switches at the receiver which cause only the selected part of the field to be displayed. Such systems, however, require the use of special television receivers or require modification of existing television receivers. Accordingly, such systems are sufficiently costly to inhibit the growth in demand for such techniques. The ideal system should merely require as a receiver only a conventional home receiver which is not internally modified and a control box to perform the selection functions.

It is a prime object of the invention to provide such a receiver.

It is another object of the invention to provide a television receiver which can select portions of fields of received television signals for display wherein the required selection is performed external to the receiver through the use of synchronizing signals radiated from the television receiver.

Briefly, the invention contemplates apparatus for blanking portions of fields of a television video signal, including raster-synchronizing signals, which are received by a television receiver. The apparatus comprises a gating means interposed between a signal-receiving input such as a coaxial cable or an antenna and the antenna terminals of the television receiver. The gating means controls the transmission of all the television signals to the receiver. The gating means has a control signal input for controlling the times of signal transmission to the gating means. Selection can be made by utilizing the horizontal and vertical synchronizing signals in conjunction with user-operable switches to control the timing of the blanking signal to perform the desired selections. Since the blanking is done at the antenna terminals of the television receiver, no internal modifications of the receiver are required and the receiver need not be entered physically for any reason.

However, it is very important that the R.F. signals associated with the horizontal and vertical synchronizing pulses for the raster and the color reference burst not be disturbed or improper locking of the sweeps and color regenerator will result. Accordingly, the invention further contemplates the generation of an override signal which is fed to the gating means to insure transmission during the times of occurrence of such synchronizing signals. However, the override signal is dependent on the times of occurrence of the synchronizing signals. Therefore, the invention further contemplates the sensing of the vertical and horizontal raster drive signals, i.e., the sweep currents fed to deflection yoke to determine the time of occurrence of the raster-synchronizing signals. According to the invention, means external to the receiver radiately sense these raster drive signals. These signals cannot be used directly since they occur slightly after the raster-synchronizing signals are received. Therefore, the invention provides means for delaying the raster drive signals until they coincide with the next occurring raster-synchronizing signals.

Other objects, features and advantages of the invention will be apparent from the following detailed description when read with the accompanying drawing, wherein.

Figure 1:
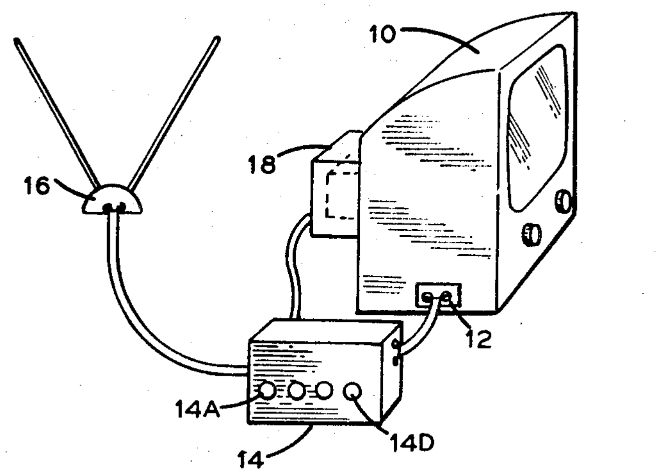
FIG. 1 shows a perspective view of a conventional television receiver, antenna and selection box, in accordance with the invention.

In FIG. 1 there is shown a conventional home television receiver 10 whose antenna input terminals 12 are connected via a blanking selector unit 14 to an antenna 16. An inductive pickup device 18 positioned on the back of the receiver housing in the vicinity of the CRT deflection yoke is connected to blanking selector unit 14.

In operation, the television video signals picked up by antenna 16 are selectively fed by blanking selector unit 14 to receiver 10. At the same time, the horizontal and vertical raster drive signals fed to the yoke of the cathode-ray tube of the receiver are inductively picked up by device 18 and fed to blanking selector unit 14. Blanking selector unit 14 includes four switches 14A to 14D for activating circuits which process the raster drive signals to select particular quadrants of the television fields for passage to the receiver 10. For example, when switch 14A is depressed only the upper left hand quadrant of the fields will be displayed.

Figure 2:
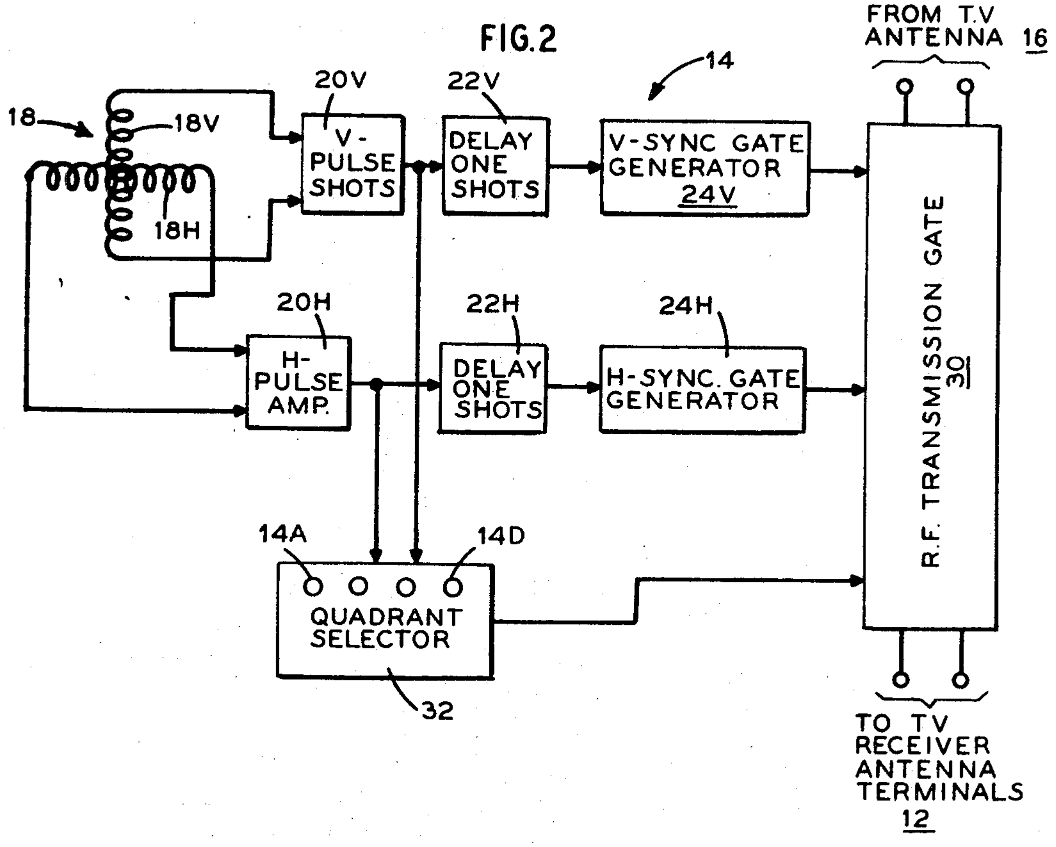
FIG. 2 shows a block diagram of the circuitry for selectively blanking portions of received television fields.
Figure 3:
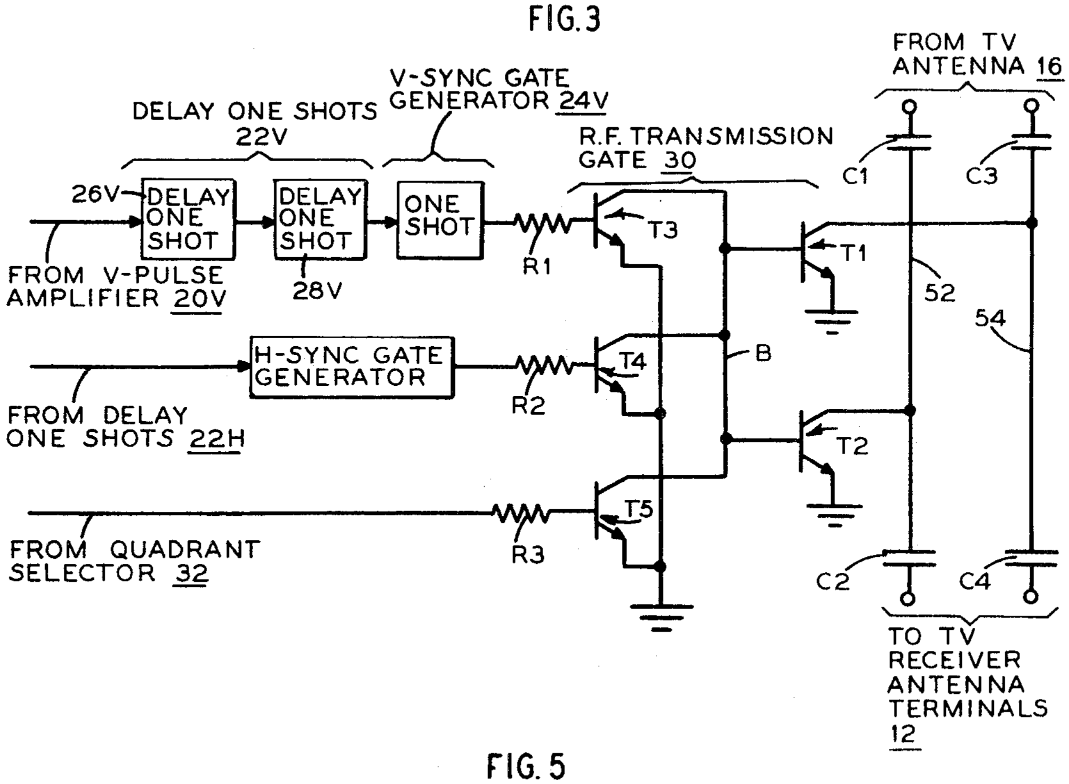
FIG. 3 shows a schematic associated with the R.F. transmission gate of FIG. 2.

The circuitry for performing these operations is shown in FIG. 2. The inductive pickup device 18 can be a conventional television CRT yoke having horizontal coils 18H and vertical coils 18V. Although inductive pickup is shown, any other radiation pickup such as capacitive sensing could be used. The vertical coils 18V sense the vertical raster drive signals (See FIG. 4) and feed them to V-pulse amplifier 20V where they are amplified and shaped to pulses. Amplifier 20V can be an overdriven clipping amplifier or a Schmitt trigger. The output of V-pulse amplifier 20V is fed to delay one-shots 22V. One-shots 22V can be a pair of cascaded one-shots 26V and 28V in the form of monostable multivibrators (as shown in FIG. 3), which then triggered emits a pulse. The output of one-shots 22V is fed to V-sync gate generator 24V which emits a pulse having a duration which can bracket a vertical raster-synchronizing pulse (i.e., nine horizontal lines) and which occurs at the time of reception of such pulse at TV antenna 16 (See FIG. 4). The one-shot 28V is adjusted so that the time of duration of the pulse emitted therefrom plus the time of duration of the pulse emitted by one-shot 26V equals the time between the sensing of a vertical raster drive signal by coil 18V and the leading edge of the next occurring vertical raster-synchronizing signal received by antenna 16. Generator 24V emits a pulse which has a duration which is substantially equal to the duration of the vertical raster-synchronizing signal. The output of V-sync gate generator 24V is fed to one input (an override input) of R.F. transmission gate 30. In addition, the output of V-pulse amplifier 20V is fed to an input of quadrant selector 32.

Figure 4:
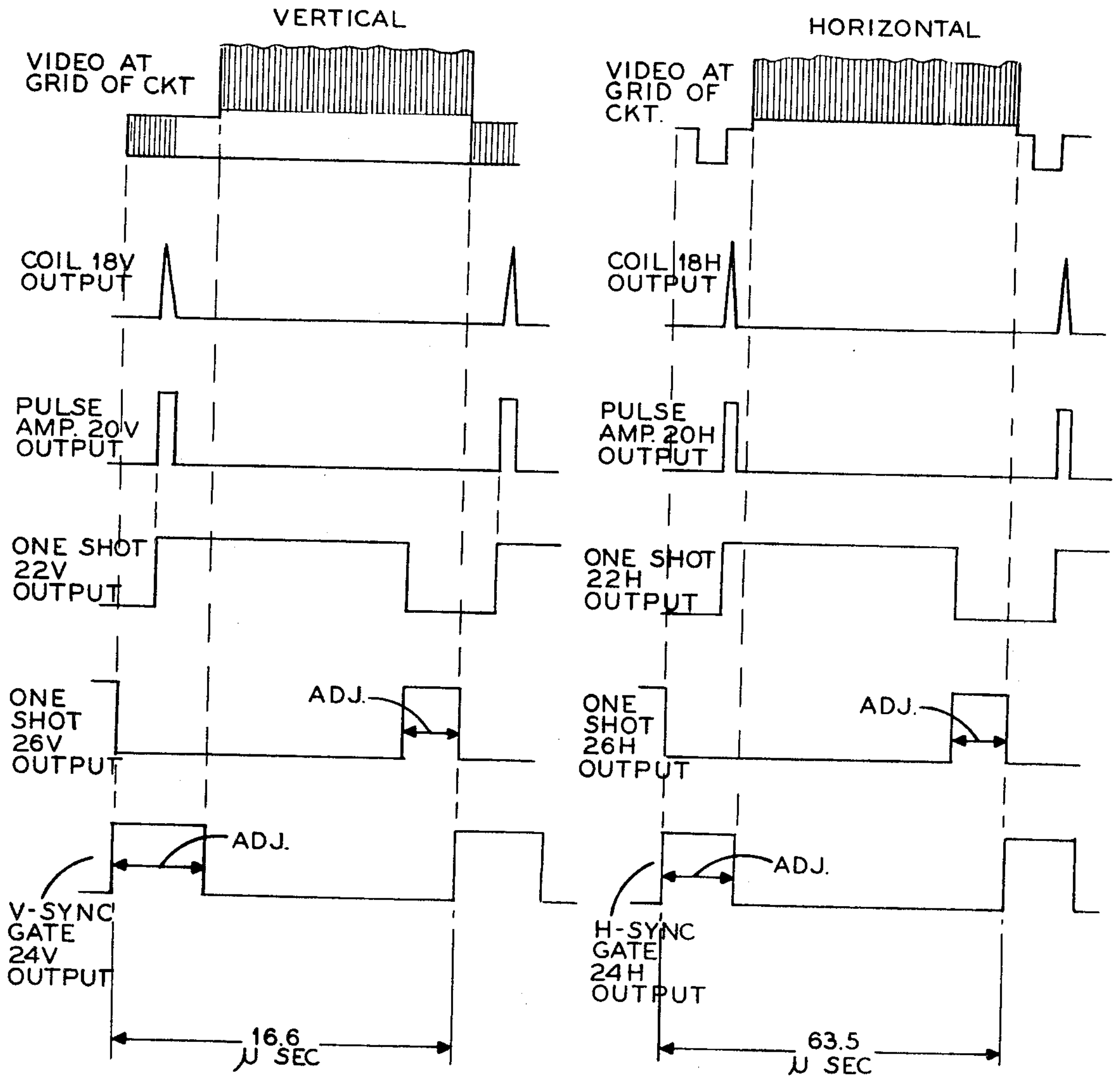
FIG. 4 shows waveforms for explaining the invention.

A second override channel for the horizontal synchronizing signals comprises horizontal coils 18H, H-pulse amplifier 20H, a pair of delay one-shots 22H and H-sync gate generator 24H. Since the elements are similar to those in the vertical channel, the elements will not be further described. The only point to be noted concerns the timing of the pulses. Since this channel is related to horizontal raster-synchronizing signals, the pulse times are scaled to the period and duration of the horizontal raster-synchronizing signals as shown in FIG. 4.

Figure 5:
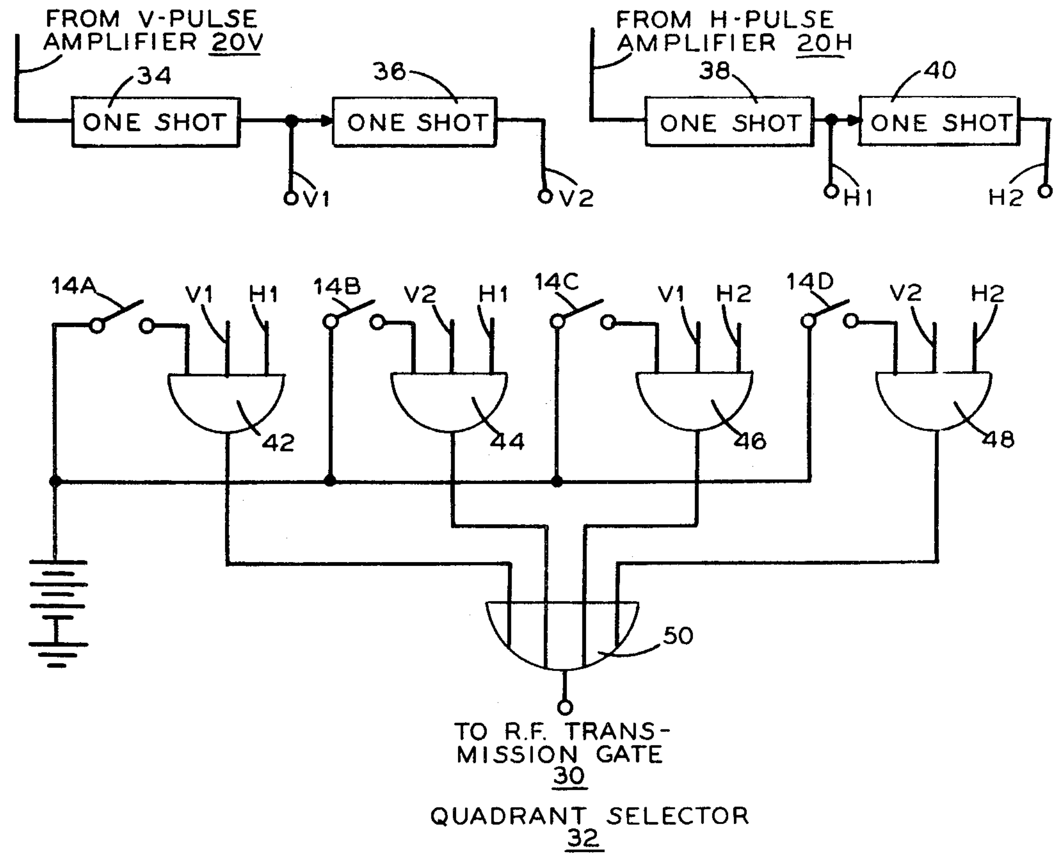
FIG. 5 shows the details of the quadrant selector of FIG. 2.

The quadrant selector 32 receives the outputs of the V-pulse amplifier 20V and the H-pulse amplifier 20H and transmits unblanking signals to a third input of gate 30 in accordance with which quadrant is to be displayed as determined by which of the switches 14A to 14D is depressed. For example, if the first quadrant (upper left) is to be displayed switch 14A is depressed and the selector emits unblanking signals for the first half of each raster line for the top half of the fields. The actual implementation is shown in FIG. 5.

The quadrant selector 32 can comprise two pairs of cascaded one-shots 34–36 and 38–40, and a logical network of AND-gates 42, 44, 46 and 48 and an OR-circuit 50.

The pair of cascaded one-shots 34 and 36, each of which can be a monostable multivibrator which generates a pulse having a duration substantially equal to 8.3 milliseconds, is triggered by pulses from V-pulse amplifier 20V. For each pulse received from amplifier 20V one-shot 34 emits a pulse on line V1 followed by one-shot 36 emitting a pulse on line V2. The pulses occur serially with the trailing edge of the pulse on line V1 substantially coinciding with the leading edge of the pulse on line V2. The pair of cascaded one-shots 38 and 40 are similar except that they are triggered by pulses received from H-pulse amplifier 20H and emit 31.75 microsecond pulses on lines H1 and H2.

Each of the three-input AND-gates 42–48 has one input connected to one of the switches 14A to 14D. The depression of a switch alerts the associated gate to pass a signal. The remaining two inputs of each of the gates is connected to a combination of the lines V1, V2 and H1 and H2. For example, AND-gate 42 has one input connected to switch 14A, a second input to line V1 and a third input to line H1. Thus, when switch 14A is depressed AND-gate 42 will pass a signal during the first half of all raster lines which occur during the top half of a field. The outputs of all AND-gates are fed to inputs of OR-circuit 50 whose output is connected to a third input of R.F. transmission gate 30.

R.F. transmission gate 30, as shown in FIG. 2, controls the transmission of video signals from antenna 16 to terminals 12 of receiver 10. Gate 30 operates as follows, first ignoring override signals from V-sync gate 24V and H-sync gate 24H. Transmission gate 30 will only transmit signals during the presence of a signal from selector 32. Therefore, since selector 32 generates signals only in response to the depression of one of the switches, no video signal is transmitted to the receiver 10 unless a switch is depressed, and, when a switch is depressed, only signals associated with the quadrant related to the depressed switch will pass through the gate. However, to insure that raster-synchronizing signals are always fed to the receiver 10, the signals from V-sync gate generator 24V are always fed to transmission gate 30. Thus, regardless of the state of quadrant selector 32, transmission gate 30 always transmits the raster-synchronizing signals.

The details of R.F. transmission gate 30 are shown in FIG. 3. One lead of antenna 16 is connected via DC isolation capacitor C1, line 52 and DC isolation capacitor C2 to one of the receiver antenna terminals 12. The other lead of antenna 16 is connected, via DC isolation capacitor C3, line 54 and DC isolation capacitor C4 to the other of the receiver antenna terminals 12. Line 52 is connected to the collector of transistor T1. Line 54 is connected to the collector of transistor T2. The emitters of transistors T1 and T2 are grounded. The bases of transistors T1 and T2 are connected to bus B. Whenever the signal on bus B is high, transistors T1 and T2 are conducting and lines 52 and 54 are grounded. Thus, any signals received by antenna 16 are shorted to ground and do not enter the receiver. If the signal on bus B is low, transistors T1 and T2 are nonconducting, lines 52 and 54 are isolated from ground, and video signals can flow from antenna 16 to terminals 12.

The signal on bus B is controlled by transistor T3, T4 and T5 whose collectors are connected to but B and whose emitters are grounded. The base of transistor T3 is connected by current-limiting resistor R1 to the output of V-sync gate 24V, the base of transistor T4 is connected by current-limiting resistor R2 to the output of H-sync gate 24H and the base of transistor T5 is connected via current-limiting resistor R3 to quadrant selector 32. The transistors T3, T4 and T5 operate as an OR-circuit such that a signal received by any one of the sync gates 24V and 24H or from quadrant selector 32 will cause bus B to drop and prevent conduction by either of the transistors T1 and T2.

Although a specific embodiment has been shown many variations are possible. For example, instead of selecting quadrants, horizontal bands could be selected. Instead of using switches to select the unblanking, a band could be permanently unblanked while other bands are selectively unblanked. Furthermore, control signals included in the video signals could be used to control the times of operation of the selector switches which can be arrayed in banks with the control signals energizing the banks.

What is claimed is:

1. Apparatus for blanking portions of the fields of a television video signal including raster-synchronizing signals which are received by a television receiver comprising gating means interposed between a signal-receiving input and the antenna terminals of the television receiver for controlling the transmission of video signals from the signal-receiving input and the antenna terminals, said gating means including a control signal input means adapted to receive a blanking signal for controlling the times of signal transmission through said gating means and an override signal input means for controlling said gating means to transmit signals received at the signal-receiving input to the antenna terminals regardless of the presence or absence of the blanking signal, means for radiatively receiving the raster driving signals generated by the television receiver in response to received raster-synchronizing signals, means for delaying each such radiatively received raster-driving signal for a time to coincide with the next occurring raster-synchronizing signal received at the signal-receiving input, and means for applying the delayed signals to said override signal input means so that raster-synchronizing signals are always transmitted through said gating means regardless of the presence or absence of a blanking signal.

2. The apparatus of claim 1 further comprising means for converting the delayed signals to pulses having durations substantially equal to the durations of raster-synchronizing signals.

3. The apparatus of claim 2 wherein said means for radiatively receiving the raster-driving signals comprises induction pickup means located outside the housing of the television receiver in the region of the deflection yoke of said television receiver.

4. The apparatus of claim 1 further comprising blanking signal generating means including means for receiving the raster-driving signals, means for shaping and timing said raster-driving signals to a plurality of different blanking signals occurring at different times during each raster and subject operable means for selecting which one of said different blanking signals is transmitted to said control signal input means at any given time.

5. The apparatus of claim 4 further comprising means for converting the delayed signals to pulses having durations substantially equal to the durations of raster-synchronizing signals.

6. The apparatus of claim 5 wherein said means for radiatively receiving the raster-driving signals comprises inductive pickup means located outside the housing of the television receiver in the region of the deflection yoke of said television receiver.

* * * * *